Patented Aug. 7, 1945

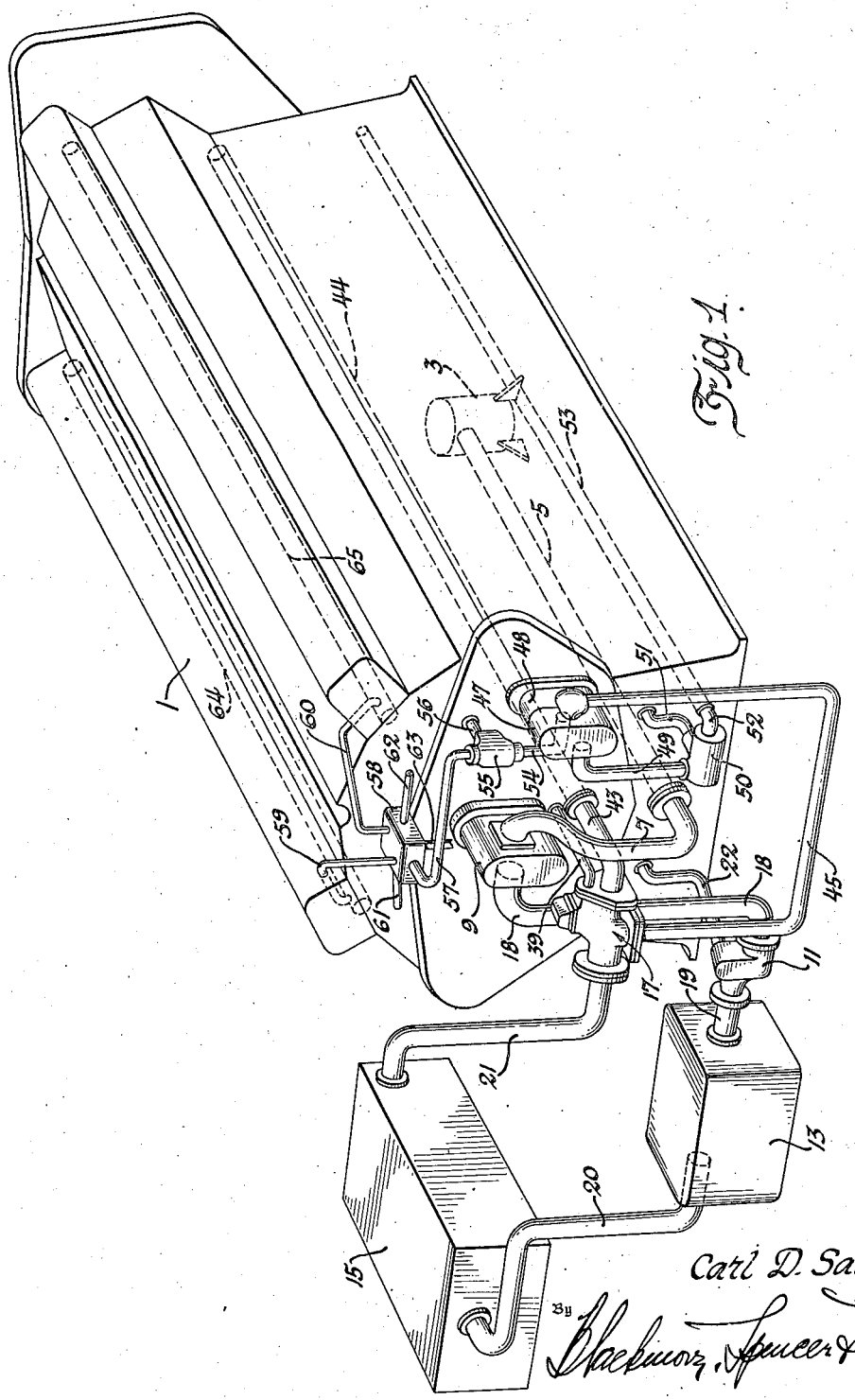

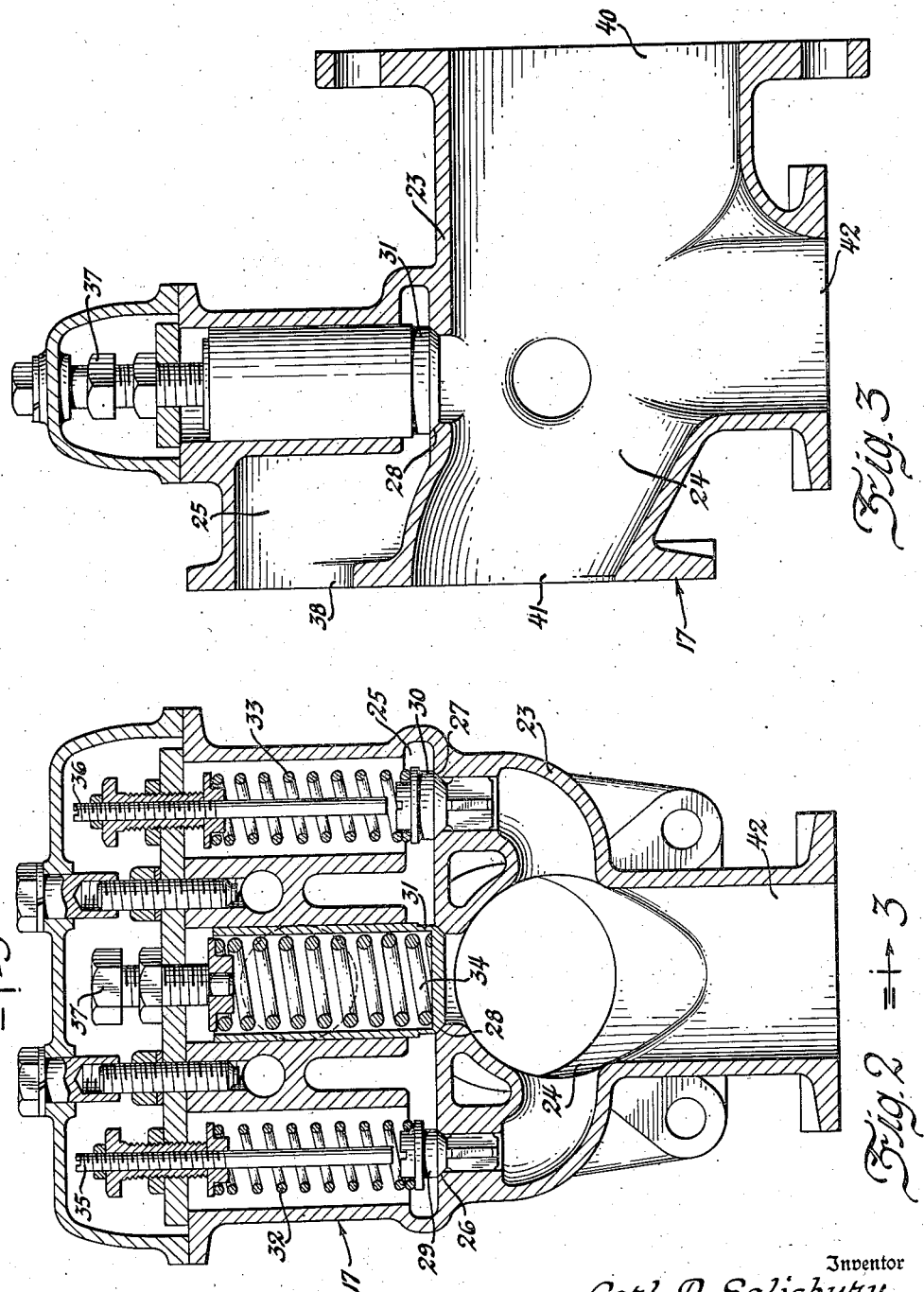

2,381,839

UNITED STATES PATENT OFFICE 2,381,839

ENGINE LUBRICATING SYSTEM

Carl D. Salisbury, Lakewood, Ohio, assignor to General Motors Corporation, Detroit, Mich., a corporation of Delaware Application November 27, 1942, Serial No. 467,098

3 Claims. (Cl. 184—6)

The present invention relates generally to lubricating systems and more particularly to a lubricating system whereby the lubricating fluid is cooled, filtered and the volume and pressure supplied to the various wearing surfaces of prime mover and its auxiliaries are accurately controlled.

In conventional lubricating systems one or more pumps and pressure relief valves are used to supply lubricant through metering nozzles to various wearing surfaces and only that portion of the lubricant from one or more relief valves is filtered and cooled. With such system changes in the temperature and viscosity of the lubricant cause variations from the proper amount of lubricant supplied to both the wearing surfaces and the lubricant cooling and filtering elements.

One of the objects of the present invention is to provide means whereby proper values of pressure and volume of lubricant is supplied to various wearing surfaces of a prime mover and auxiliaries driven thereby when operated under different conditions of speed load and temperature.

Another object being to provide means for cooling and filtering all of the oil supplied to the various wearing surfaces of the engine and its auxiliaries.

The means included in my lubricating system for accomplishing the above objects will be better understood by reference to the following detailed description and the accompanying drawings illustrating my system applied to an internal combustion engine of the compression ignition type.

Figure 1 of the drawings is a diagrammatic perspective view of the lubricating system as applied to an engine, and Figures 2 and 3 are sectional views of one of the control valves included in the system, Figure 3 being taken on line 3—3 of Figure 2.

Referring to Figure 1, there is shown in the sump of the engine 1 an oil strainer 3 and pipes 5 and 7 connecting the strainer with the suction side of an engine driven main lubricating pump 9 of the gear type mounted on the end of the engine 1. The strainer 3 and pipe 5 being shown in dotted lines. The pressure or discharge side of the main pump 9 is connected in series with an adjustable pressure relief valve 11, an oil filter 13, and oil cooler 15 and another adjustable pressure relief valve indicated generally at 17, by means of the pipes 18, 19, 20 and 21, the by-pass side of the pressure relief valve 11 being shown connected by a pipe 22 to the engine sump in the usual manner.

The details of the pressure relief valve generally indicated at 17 in Figure 1 are best shown in Figures 2 and 3. This valve comprises a valve body 23 including a pressure passage 24 and a relief passage 25 and three openings therebetween provided with valve seats 26, 27 and 28 on which three poppet valves 29, 30 and 31 are normally retained by springs 32, 33 and 34 having means 35, 36 and 37 for adjusting the tension thereof. An opening 38 provided in the relief passage 25 is connected by a pipe 39 to the engine sump, as shown in Figure 1 and the pipe 21 is connected to an opening 40 in the pressure passage 24 having additional outlet openings 41 and 42. The opening 41 is connected by a pipe 43 to an engine main bearing lubricating manifold shown in dotted lines at 44 in Figure 1 for lubricating the engine main and connecting rod bearings, not shown, in conventional manner. The opening 42 as best shown in Figure 1 is connected by a pipe 45 to the inlets of a two unit engine driven gear pump, the separate pump units thereof being indicated at 47 and 48.

The outlet of the pump unit 47 is connected by a pipe 49 to an adjustable pressure relief valve 50 of conventional type. The relief side of the relief valve 50 being connected to the engine sump by a relief pipe 51 and the pressure side of this valve being shown connected by a pipe 52 to an engine piston cooling manifold 53 shown in dotted lines in Figure 1 for supplying cooling and lubricating oil to the engine pistons and wrist pins, not shown.

The outlet of the other pump unit 48 is connected by a pipe 54 to another adjustable pressure relief valve 55 of conventional type having the relief side thereof connected by a pipe 56 to the engine sump and the pressure side connected by a pipe 57 to a fitting 58 having pressure outlet pipes 59, 60, 61, 62 and 63 shown extending therefrom. The pipes 59 and 60 are connected to separate manifolds 64 and 65, shown in dotted lines, for supplying oil to the engine camshaft bearings and other valve and fuel injector operating mechanisms, not shown. The pressure outlet pipes 61, 62 and 63 are provided for supplying oil to lubricate the surfaces of the driving and driven members for other engine and engine auxiliaries such as the blower mechanisms and the like, not shown.

As previously mentioned the adjustable pressure relief valve 11, filter 13, cooler 15 and pressure relief valve 17 are connected in series with the pressure side of the main lubricating pump 9 driven by the engine 1 and the engine main bearing manifold 44 and inlet side of both of the gear pump units and connected in parallel with the pressure passage 24 of the pressure relief valve 17. With this arrangement and by the provision of a plurality of relief valves 29, 30 and 31 in the pressure relief valve of different areas as shown, and biased on the respective valve seats 26, 27 and 28 by separate springs of different rate, each capable of adjustment by the respective spring tension regulating means 32, 33 and 34, the valves 29, 30 and 31 may be caused to be moved off of their seats separately and in combination by values of fluid pressure slightly different from the pressure necessary to cause the relief valve 11 to open in order to maintain the pressure in the engine main bearing manifold 44 and the inlet side of both gear pump units 47 and 48 within a predetermined narrow range of pressure valves at normal engine speeds for variable temperature and viscosity of the oil.

The gear pump units 47 and 48 may be of the same or different capacity as the main pump 9 and may be rotated at the same or different values of speed with respect to that of the main pump depending upon the required volume of flow it is desired to pass through each of these pumps. As the volume of oil through a gear pump depends upon the volume of the clearance space between the gears and the pump housing and the speed of the gears and as the inlet pressure is maintained substantially constant, any desired volume of oil may be obtained through each of the pumps 47 and 48 which accordingly function accurately as quantity measuring or metering devices. In the system shown the gear pumps 47 and 48 are of different capacity and the total capacity or clearance volume of both is less than that of the main pump 9 which is driven by the engine at the same speed as the pumps 47 and 48. As less oil pressure is generally required for the auxiliary devices than for the engine main bearings the relief valves 50 and 51 connected respectively to the outlets of the pumps 47 and 48 may be set to any desired pressure with respect to the substantially constant higher value of pressure maintained on the inlet side of these pumps as has been previously mentioned.

It will be evident that the above described lubrication system provides means for filtering, cooling all the lubricating oil supplied and for accurately controlling both the pressure and volume of oil supplied to the various wearing parts of both the engine and its auxiliaries at the desired values. This arrangement prevents excessive oil consumption at low engine speeds with cold oil and proper lubrication at normal speeds of the engine when the oil is at normal temperature.

I claim:

1. A lubricating system for an engine and auxiliaries driven thereby comprising main and auxiliary gear type lubricating pumps driven by the engine, said main pump being capable of supplying excessive amounts of lubricating oil to said engine and auxiliaries under all conditions of engine operation, said auxiliary pump being of smaller capacity than said main pump, pressure connections including a plurality of pressure relief valves leading from the outlet of said main pump to the engine main bearing and to the inlet of said auxiliary pump, said pressure relief valves having different sized relief openings and adapted to operate at different pressures in order that a narrow range of pressure is applied to the engine main bearings and inlet of said auxiliary pump for wide variations in temperature and viscosity of the lubricating oil for normal operating speeds of the engine so that a substantially constant volume of oil is passed by said auxiliary pump, and a supply connection between the outlet of said auxiliary pump and certain of said engine auxiliaries.

2. A lubricating system for an engine and auxiliaries driven thereby comprising an engine driven main gear pump capable of supplying excessive amounts of oil to the engine and auxiliaries under all operating conditions, a plurality of engine driven auxiliary gear pumps of less capacity than said main pump, pressure connections including a plurality of adjustable relief valves leading from the outlet of said main pump to certain of said engine parts and the inlet of each of said auxiliary pumps, said pressure relief valves being adjustable to maintain a limited range of pressure variations in said pressure connections for wide variations in oil temperature and viscosity so that substantially constant volume of oil is passed by each of said auxiliary pumps for normal operating speeds of the engine, and separate pressure connections, each including an adjustable pressure relief valve leading from each auxiliary pump inlet to certain other parts of the engine and the engine auxiliaries so that proper values of oil pressure are applied thereto.

3. A lubricating system for an engine and engine driven auxiliaries comprising an engine driven main pump of sufficient capacity to supply lubricating oil in excessive quantities to the engine and auxiliaries under all operating conditions, a plurality of engine driven auxiliary gear pumps of less capacity than the main pump, pressure connections from the outlet of the main pump to the inlet of each auxiliary pump and to certain engine parts, oil conditioning means and a plurality of adjustable pressure relief valves included in said pressure connections, said relief valves being capable of adjustment for operation at different pressures to maintain a narrow range of variations in said pressure connections for wide variations in temperature and viscosity of the oil in order that each of said auxiliary pumps will pass a substantially constant volume of oil, depending upon the pump capacity for normal operating speeds of the engine, at least one of said relief valves being located on the inlet side of said oil conditioning means to prevent excessive pressure thereon, and separate pressure connections, each including an adjustable relief valve and connected to the outlet of one of said auxiliary pumps for supplying certain other parts of said engine and engine auxiliaries with a preselected amount of oil at a preselected pressure determined by the adjustment of said last mentioned pressure relief valves.

CARL D. SALISBURY.